United States Patent Office 2,927,034
Patented Mar. 1, 1960

2,927,034

MANUFACTURE OF REGENERATED CELLULOSE SPONGE MATERIAL

Chen Ming Chih, Snyder, N.Y., assignor to General Mills, Inc., Minneapolis, Minn.

No Drawing. Application October 25, 1956
Serial No. 618,177

6 Claims. (Cl. 106—122)

This invention relates to production of regenerated cellulose sponge materials, or the like.

Previously, commercial processes for the gelation and regeneration of viscose or cuprammonium cellulose have been quite laborious and time-consuming, and productive of less than the desired qualities in the product. For example, production of regenerated cellulose by the viscose method and by the cuprammonium method has heretofore involved application of heat over long periods of time to the viscose or to the cuprammonium solution of cellulose while immersed in special chemical solutions, for the purpose of regenerating or coagulating the cellulose content of the mix. The heat application is customarily effected as by boiling in a liquid, baking in an oven, or by electrical heating or the like. These chemical solutions must be constantly monitored, but such methods nevertheless cause undesirable degradation of the cellulose, resulting in structurally and chemically weakened products. Further, for example in the manufacture of rayon, cellophane, and the like, the viscose or cuprammonium cellulose, as the case may be is usually regenerated by immersion in an acid bath; but such operations are notoriously time-consuming and expensive, and require expert control.

To produce a sponge type product incidental to the above processes, sodium sulfate crystals are usually premixed into the viscose or the cuprammonium cellulose, and leached or melted out of the mix simultaneously with the regeneration operation referred to hereinabove. As an alternative to the use of the salt crystal and leaching process just mentioned, attempts have been made to gas-foam the material such as by whipping air into it, or by dispersing a gas-generating chemical therethrough, prior to the regenerating process. However, it has been determined that such methods are impracticable because the foamed structures so produced are difficult to control and tend to collapse and degrade before the required regeneration cycle can be completed. To avoid such difficulties and disadvantages by giving the foamed structure suitable frame support, the use of additives such as glues, resins or the like has been suggested. It has also been proposed to employ specially prepared highly-aged viscose in an effort to reduce the required gelation and regeneration time. These prior attempts to effect regeneration before collapse of the foam structures have been found to be impracticable, because of the expense, excessive time delays, the equipment investments required, and the highly critical and expert procedural controls necessary to render such systems operable.

This invention contemplates an improved method and means for the gelation and regeneration of cellulose from either viscose or cuprammonium cellulose. The invention provides a novel mechanism for accelerating the gelation and regeneration of the cellulose component of the raw material; hence substantially reducing the time necessarily involved in the process and thereby avoiding prior art difficulties such as tendencies of the foam structure to collapse and/or degradation of the cellulose, as discussed hereinabove. Furthermore, the method of the present invention permits use merely of a hot water treatment to remove the by-products and impurities and to aid in the completion of regeneration and purification of the regenerated cellulose; as distinguished from acid and salt bath treatments heretofore required. The method is otherwise advantageous and practicable whether the viscose employed in the process is of the relatively green or aged forms.

We have discovered that the gelation and regeneration of cellulose from viscose or from a cuprammonium solution of cellulose, may be rapidly accelerated simply by the addition of a compound having one or more halogen atoms plus one or more hydroxyl, acid, ester, aldehyde or keto groups in which one functional group is located so as to activate the other functional group. Such compounds are found in the regeneration accelerating group of materials including; ethylene chlorohydrin, ethylene bromohydrin, 1-Cl-2,3, dihydroxypropane, 3-Cl-hydroxypropane, epichlorohydrin, 2,2,2-trichloro-1-methylpropanol, chloroacetic acid, chloroacetaldehyde, trichloroacetaldehyde, etc. Apparently, when such an additive is mixed with the cellulose source material in accord with the present invention, a chemical regeneration of t..e cellulose is brought about by the chemical reaction of cellulose xanthate with ethylene chlorohydrin (or its alternative) to give cellulose and the xanthate of ethylene chlorohydrin. In the cuprammonium process it is believed that the reaction occurs between cuprammonium cellulose and ethylene chlorohydrin, to give cellulose and the copper tetrammonium complex of ethylene chlorohydrin.

The heat from these exothermic reactions as well as from the partial hydrolysis of the regeneration accelerator aids in the uniform and rapid gelation of the viscose. The rate of gelation is controlled by the amount of accelerator and caustic in the system. If just enough accelerator to regenerate the viscose is added, with a salt to retard hydrolysis, the rate of viscose gelation and regeneration will be reduced. The speed of regeneration may therefore be easily regulated to be sufficiently rapid to preclude collapse of a porous structure such as may have been previously established in the mix by air-whipping or gas-bubbling the latter just prior to the regeneration step. Also, the accelerated method for regenerating cellulose, of the invention, results in products of improved strength and quality because of the elimination of the prior art time-consuming methods which resulted in degradation of the cellulose.

Furthermore, it has been determined that the porosity characteristics of a cellulose sponge mix may be substantially preserved when the mix is regenerated rapidly in accord with the present invention, even though the mixture may have been formulated from relatively green or unaged viscose or the like. Hence, the invention obviates the need for carefully "ripened" viscose in order to obtain proper sensitivity to coagulation.

Exemplary formulations and procedures in accord with the invention are as follows:

*Example 1.*—Mix 200 gms. of viscose containing 9.5% cellulose and 5.5% sodium hydroxide with 300 gms. of a 2–5% solution of sodium hydroxide. After thoroughly mixing, add 15 gms. of a foaming agent (such as an alkyl aryl sulfonate which is alkali stable) and disperse 2–6 gms. of fiber reinforcement throughout. Foam by any conventional means to a volume of a about 2000 ml. Add 35 gms. of ethylene chlorohydrin and continue mixing to obtain complete dispersion. Pour this foam into a mold and allow to stand for 15 minutes during which time gelation and regeneration is completed. Place in boiling water for 15 minutes to remove organic sulfides formed during regeneration and wash with hot water.

*Example 2.*—Mix 300 gms. of a 5–10% solution of cellulose in cuprous ammonium hydroxide with 20–40 grams of epichlorohydrin. Cast a film of the mixture .1 to 5 mm. in thickness onto a rotating heated drum. Adjust the speed and temperature of the drum so that gelation and coagulation are complete after one-quarter revolution. Remove the film from the drum and purity in a hot water bath.

*Example 3.*—Dilute 200 gms. of viscose (8% cellulose, 5% sodium hydroxide) with 200 gms. of 4% potassium hydroxide. Add 20 gms. of a chemical blowing agent such as Du Pont BL 353 and mix thoroughly. Add 20 to 40 gms. of 30% 2-bromoethanol and continue mixing. Pour the mixture into a mold and allow to stand for 15 minutes, during which time the mixture will expand to approximately 1,500 ml. and the cellulose will regenerate. Remove the sponge from the mold and place in boiling water to remove impurities.

What is claimed is:

1. The process of producing a regenerated cellulose sponge which comprises preparing a solution of cellulose selected from the group consisting of viscose and cuprammonium cellulose, foaming said solution into a porous structure and then regenerating said cellulose solution in the presence of an excess of alkali and a regeneration accelerating compound having as functional groups at least one halogen atom and at least one hydroxyl group in which one functional group is so located as to activate the other functional group.

2. A process according to claim 1 in which the regeneration accelerating compound is ethylene chlorohydrin.

3. A process according to claim 1 in which the regeneration accelerating compound is ethylene bromhydrin.

4. A process according to claim 1 in which the regeneration accelerating compound is 1-chloro-2,3-dihydroxypropane.

5. A process according to claim 1 in which the regeneration accelerating compound is 3-chlorohydroxypropane.

6. A process according to claim 1 in which the cellulose solution is converted into a porous structure by means of an inert gas.

References Cited in the file of this patent
UNITED STATES PATENTS

| | | |
|---|---|---|
| 1,938,032 | Lillienfield | Dec. 5, 1933 |
| 2,021,862 | Lillienfield | Nov. 19, 1935 |
| 2,319,051 | Fordyce et al. | May 11, 1943 |

FOREIGN PATENTS

| | | |
|---|---|---|
| 384,668 | Great Britain | Dec. 5, 1932 |